US008348804B2

(12) United States Patent
Lane et al.

(10) Patent No.: US 8,348,804 B2
(45) Date of Patent: Jan. 8, 2013

(54) HYBRID ENGINE SYSTEM WITH TRANSIENT LOAD ASSISTANCE

(75) Inventors: William Henry Lane, Chillicothe, IL (US); Barry Mei, Dunlap, IL (US); Michael John Barngrover, Peoria, IL (US); Baojun Peter Si, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 1392 days.

(21) Appl. No.: 12/010,075

(22) Filed: Jan. 18, 2008

(65) Prior Publication Data

US 2009/0186741 A1  Jul. 23, 2009

(51) Int. Cl.
*B60K 1/02* (2006.01)
(52) U.S. Cl. .......................... 477/3; 180/65.29
(58) Field of Classification Search ........ 477/3; 903/907; 701/22; 290/40 C; 180/65.265, 65.29, 65.275; 60/716
See application file for complete search history.

(56) References Cited

U.S. PATENT DOCUMENTS

| | | | | |
|---|---|---|---|---|
| 5,343,970 | A | * | 9/1994 | Severinsky ............... 180/65.25 |
| 5,806,617 | A | | 9/1998 | Yamaguchi |
| 5,826,671 | A | | 10/1998 | Nakae et al. |
| 5,862,497 | A | | 1/1999 | Yano et al. |
| 5,875,864 | A | | 3/1999 | Yano et al. |
| 5,929,609 | A | * | 7/1999 | Joy et al. .................... 322/25 |
| 6,367,570 | B1 | | 4/2002 | Long, III et al. |
| 6,390,214 | B1 | | 5/2002 | Takahashi et al. |
| 6,442,455 | B1 | | 8/2002 | Kotre et al. |
| 6,570,265 | B1 | | 5/2003 | Shiraishi et al. |
| 6,645,653 | B2 | * | 11/2003 | Kashiwagi .................... 429/415 |
| 6,856,034 | B2 | | 2/2005 | Peters et al. |
| 7,059,116 | B2 | * | 6/2006 | Kusada et al. ................. 60/285 |
| 7,077,224 | B2 | | 7/2006 | Tomatsuri et al. |
| 7,099,757 | B2 | | 8/2006 | Niki et al. |
| 7,134,982 | B2 | | 11/2006 | Ozeki et al. |
| 7,152,705 | B2 | | 12/2006 | Alster et al. |
| 7,200,476 | B2 | | 4/2007 | Cawthorne et al. |
| 7,426,910 | B2 | * | 9/2008 | Elwart ....................... 123/46 E |
| 7,431,111 | B2 | * | 10/2008 | Nada .......................... 180/65.28 |
| 7,906,862 | B2 | * | 3/2011 | Donnelly et al. ................ 290/6 |
| 7,944,081 | B2 | * | 5/2011 | Donnelly et al. .............. 307/9.1 |
| 8,108,126 | B2 | * | 1/2012 | Sykes et al. .................... 701/105 |
| 2002/0062183 | A1 | * | 5/2002 | Yamaguchi et al. ............ 701/22 |
| 2007/0012492 | A1 | | 1/2007 | Deng et al. |
| 2007/0078580 | A1 | * | 4/2007 | Cawthorne et al. ............. 701/51 |
| 2007/0113546 | A1 | | 5/2007 | Jankovic |

(Continued)

OTHER PUBLICATIONS

Lane, William H., "System for Controlling a Hybrid Energy System," U.S. Appl. No. 11/700,194, filed Jan. 31, 2007, 21 pages.

(Continued)

*Primary Examiner* — Katy M Ebner
*Assistant Examiner* — Brodie Follman
(74) *Attorney, Agent, or Firm* — Finnegan, Henderson, Farabow, Garrett & Dunner LLP

(57) ABSTRACT

A power train is provided having a power source for generating a power output. The power train also has a power storage device for storing and distributing power. The power train further has a controller configured to cause the distribution of power from the power storage device for assisting the power source when the rate of fuel entering the power source is above a threshold fuel rate. The threshold fuel rate is a fuel rate at which, assisting the power source increases the efficiency of the power train.

18 Claims, 3 Drawing Sheets

U.S. PATENT DOCUMENTS

| | | | |
|---|---|---|---|
| 2007/0251493 A1* | 11/2007 | Evans | 123/357 |
| 2008/0022686 A1* | 1/2008 | Amdall et al. | 60/716 |
| 2009/0105896 A1* | 4/2009 | Tamai et al. | 701/22 |
| 2009/0118939 A1* | 5/2009 | Heap et al. | 701/54 |
| 2009/0157244 A1* | 6/2009 | Kim | 701/22 |
| 2009/0217898 A1* | 9/2009 | Gokhale et al. | 123/179.18 |
| 2010/0043414 A1* | 2/2010 | Hirose | 60/320 |
| 2010/0274424 A1* | 10/2010 | Oe | 701/22 |
| 2011/0005212 A1* | 1/2011 | Matsushita et al. | 60/299 |
| 2011/0172867 A1* | 7/2011 | Yu et al. | 701/22 |
| 2011/0191008 A1* | 8/2011 | McConahay et al. | 701/103 |

OTHER PUBLICATIONS

Marr, Jerry D., "System for Controlling a Hybrid Energy System," U.S. Appl. No. 11/797,011, filed Apr. 30, 2007, 22 pages.

* cited by examiner

HYBRID ENGINE SYSTEM WITH TRANSIENT LOAD ASSISTANCE

TECHNICAL FIELD

The present disclosure is directed to a hybrid engine system, and more particularly, to a hybrid engine system with transient load assistance.

BACKGROUND

Existing internal combustion engines produce elevated level of emissions during transient loads (as compared to steady-state operation). This is because the transient loads may change faster than the engine can respond, which in turn, can cause a drop in the air-fuel ratio (in a load increasing situation). Such a drop in the air-fuel ratio increases the temperature of the exhaust, thus generating higher levels of NOx. The lowered air to fuel ratio also decreases the combustion efficiency which in turn produces higher level of particulate matter. If an independent power source of the hybrid system were to assist the engine during transient loads, the engine may be more likely to keep up with the changing load, thereby preventing the air-fuel ratio to drop below a desired level.

A hybrid system that utilizes an independent power source for assisting the engine during transient loads is disclosed in U.S. Pat. No. 7,152,705 (the '705 patent) issued to Alster et al. on Dec. 26, 2006. The system disclosed in the '705 patent includes two internal combustion engines, two generators, and a power storage device. During acceleration conditions, energy from the power storage device is used to assist the engines so that the engines can operate at their peak efficiency during acceleration.

Although the system disclosed in the '705 patent may utilize an independent power source (the power storage device) to assist the engines during acceleration events, the system's efficiency may be limited. In particular, the '705 system focuses on minimizing the fuel consumption of the engines for determining when and how much power is to be distributed from the power storage device. However, when an engine operates below its saturation point (i.e., its fuel limit), operating the engine without assistance from the power storage device may be more efficient, even when the engine is not operating at peak efficiency. This is because, due to various inefficiencies, only a fraction of the power transmitted to the power storage device is actually stored. When an engine operates below its saturation point, more energy might be needed to produce the power assisting the engine than would be needed by the engine to produce the same output without assistance. Therefore, the system disclosed in the '705 patent may not achieve a maximum efficiency when the engines operate below their saturation points during acceleration events.

The disclosed system is directed to overcoming one or more of the problems set forth above.

SUMMARY

In one aspect, the present disclosure is directed toward a power train. The power train includes a power source for generating a power output. The power train also includes a power storage device for storing and distributing power. The power train further includes a controller configured to cause the distribution of power from the power storage device for assisting the power source when the rate of fuel entering the power source is above a threshold fuel rate. The threshold fuel rate is a fuel rate at which, assisting the power source increases the efficiency of the power train.

Consistent with another aspect of the disclosure, a method is provided for operating a power train. The method includes sensing a first parameter indicative of a rate of fuel entering a power source. The method also includes sensing a second parameter indicative of an amount of power generated by the power source. The method further includes distributing power from a power storage device to assist the power source when the rate of fuel entering the power source is above a threshold fuel rate. The threshold fuel rate is a fuel rate at which, assisting the power source increases the efficiency of the power train.

Consistent with yet another aspect of the disclosure, a method is provided for operating a power train including receiving an input from an operator requesting a desired power output. The method also includes sensing a first parameter indicative of a rate of fuel entering a power source. In addition, the method includes sensing a second parameter indicative of an amount of power generated by the power source. The method further includes sensing a third parameter indicative of an amount of power stored in a power storage device. Furthermore, the method includes distributing power from the power storage device when the amount of power stored in the power storage device is greater than the difference between the amount of power currently being generated by the power source and the desired power output, and the fuel rate is substantially the same as or above a threshold fuel rate. The threshold fuel rate is a fuel rate at which, assisting the power source increases the efficiency of the power train.

DETAILED DESCRIPTION

Figure 1:
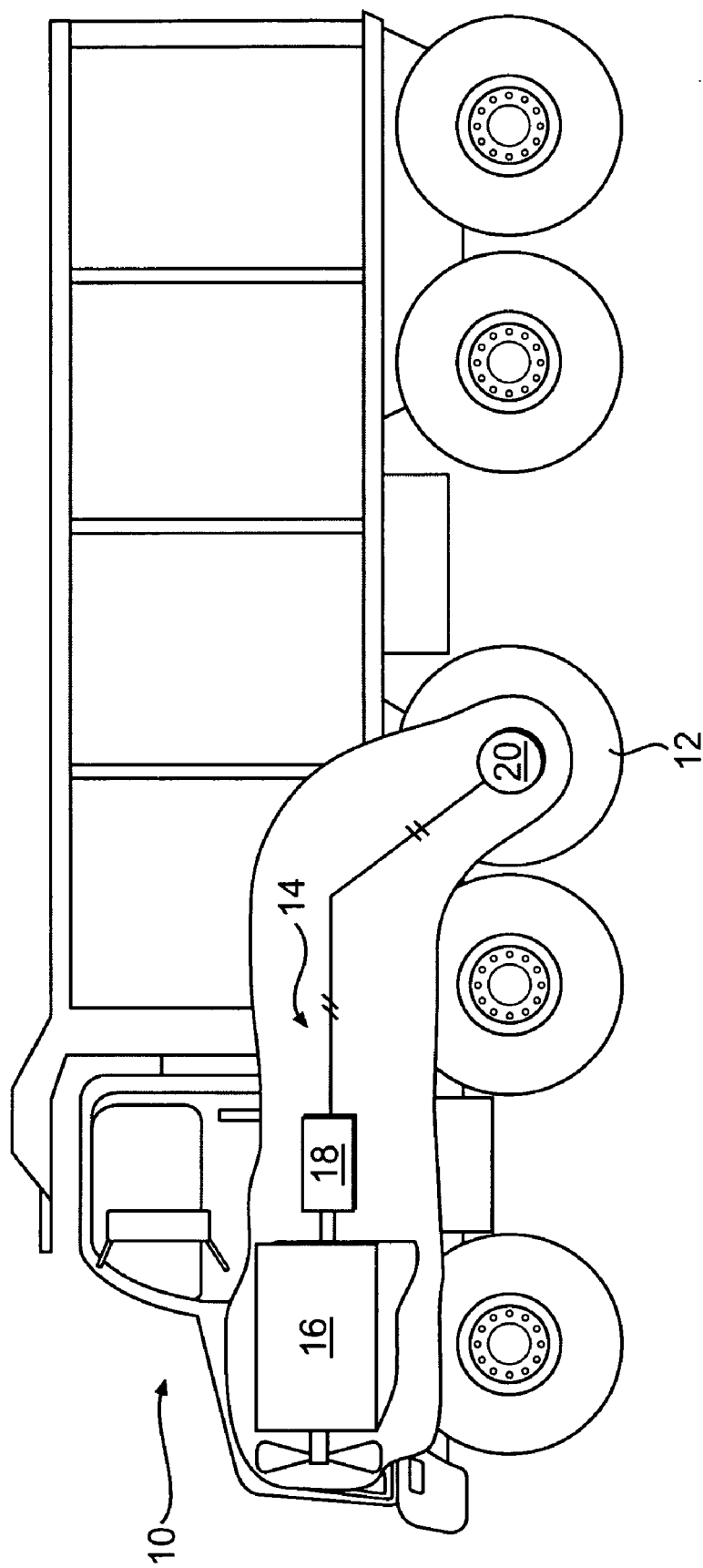
FIG. 1 is a diagrammatic illustration of an exemplary disclosed machine.

FIG. 1 illustrates an exemplary machine 10 having multiple systems and components that cooperate to accomplish a task. The tasks performed by machine 10 may be associated with a particular industry such as mining, construction, farming, transportation, power generation, or any other industry known in the art. For example, machine 10 may embody a mobile or stationary machine such as the on-highway vocational vehicle depicted in FIG. 1, a bus, an off-highway haul truck, a generator, or any other type of mobile or stationary machine known in the art. Machine 10 may include one or more traction devices 12 operatively connected to and driven by a power train 14.

Traction devices 12 may embody wheels located on each side of machine 10 (only one side shown). Alternatively, traction devices 12 may include tracks, belts or other known traction devices. It is contemplated that any combination of the wheels on machine 10 may be driven and/or steered.

Figure 2:
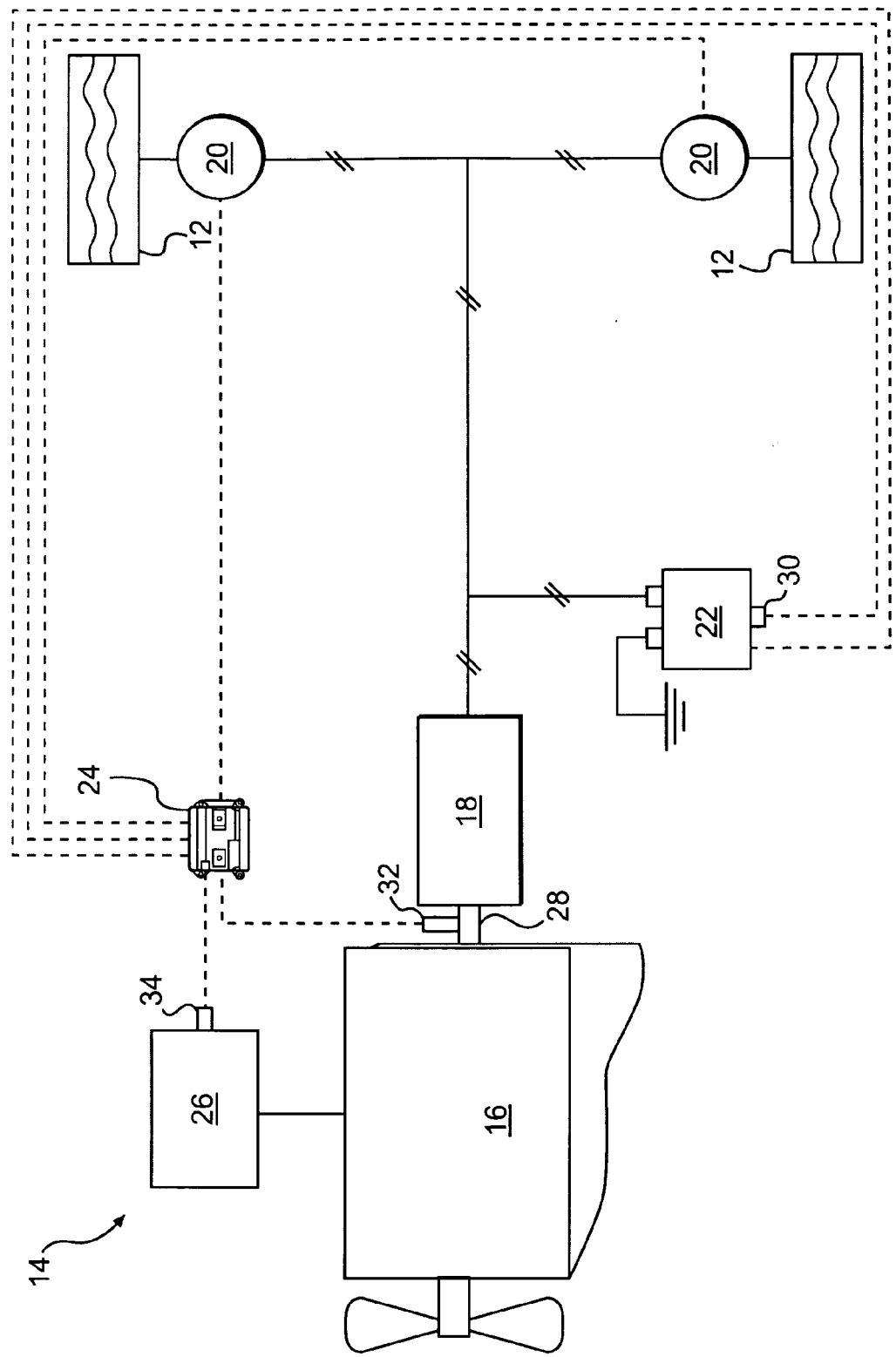
FIG. 2 is a diagrammatic illustration of an exemplary disclosed power train for used with the machine of FIG. 1.

Power train 14 may be an integral package configured to generate and transmit power to traction devices 12, hydraulic pumps (not shown) for an excavator (not shown), or any other device requiring power from a power source. In particular, power train 14 may include a power source 16, which may be operably associated with a generator 18 and may drive generator 18 such that mechanical energy from power source 16 may be converted into electric energy. Power train 14 may also include one or more motors 20 connected to receive power output from generator 18 and transmit the power output in a useful manner to traction devices 12. As shown in FIG. 2, power train 14 may further include a power storage device 22, which may store electrical energy produced by generator 18 or supply stored electrical energy to motor 20. Additionally, the components of power train 14 may be in communication with and controlled by a controller 24.

In an alternate embodiment, generator 18 may be coupled to traction devices 12 via an output shaft (not shown), and electric motors 20 may be omitted. In such an embodiment, generator 18 may drive traction devices 12 in a manner similar to that of a conventional power train with a transmission and a transmission output shaft. That is, generator 18 may directly power traction devices 12 via the output shaft.

Power source 16 may include an internal combustion engine having multiple subsystems that cooperate to produce mechanical or electrical power output. For the purposes of this disclosure, power source 16 is depicted and described as a four-stroke diesel engine. One skilled in the art will recognize, however, that power source 16 may be any other type of internal combustion engine such as, for example, a gasoline or a gaseous fuel-powered engine. One of the subsystems included within power source 16 may be a fuel delivery system 26. It is contemplated that fuel delivery system 26 may include any conventional type of components known in the art, such as, for example, an electronically controlled fuel injection system or a carburetor. Other subsystems included within power source 16 may be, for example, an exhaust system, an air induction system, a lubrication system, a cooling system, or any other appropriate system (not shown).

Generator 18 may be any known AC or DC generator such as, permanent magnet, induction, switched-reluctance, or a hybrid combination of the above, and may also be sealed, brushless, and/or liquid cooled, for example, to provide a more durable design. Generator 18 may be operatively coupled to power source 16 via a crankshaft 28, or in any other manner known in the art, and may be configured to convert at least a portion of a power output of power source 16 to electrical energy. In an exemplary embodiment, generator 18 may be configured to both drive power source 16 and be driven by power source 16. In addition, generator 18 may be used to provide electric energy to power one or more electric motors 20. It may be contemplated that generator 18 can be configured to produce a direct current (DC) output or an alternating current (AC) output. It is also contemplated that AC or DC outputs may be converted with the use of a power converter (not shown) to produce a variety of current and/or voltage outputs for use by various components of machine 10.

Electric motors 20 may be operatively coupled to generator 18 and configured to provide a mechanical force for performing a task associated with machine 10. Electric motors 20 may be any known AC or DC motor such as a permanent magnet, induction, switched-reluctance, or a hybrid combination of the above, and may also be sealed, brushless, and/or liquid cooled. Although referred to in the singular, electric motors 20 may be more than one electric motor. By virtue of receiving electric energy from generator 18 and/or power storage device 22, electric motors 20 may create a torque for driving traction devices 12. Although electric motors 20 are illustrated as a drive for one or more traction devices 12, it is contemplated that electric motor 20 may be used in any application of machine 10 that may require mechanical energy to operate.

Power storage device 22 may be any kind of known power storage device such as, for example, a battery and/or an ultra-capacitor, or flywheel. In an exemplary embodiment, power storage device 22 may store excess electric energy generated by generator 18 and/or provide any additional electric energy that may be needed when starting machine 10 and/or during operation of machine 10. A sensor 30 may be associated with power storage device 22 to sense an amount of energy stored in energy storage device 22. Sensor 30 may be any type of sensor such as, for example, a voltage sensor, a current sensor, or any other type of sensor capable of detecting a parameter of energy storage device 22 indicative of the amount of energy stored within energy storage device 22.

Controller 24 may monitor one or more parameters of power source 16 and/or fuel delivery system 26 and control the respective operations thereof. Specifically, controller 24 may determine an amount of fuel being delivered to one or more of combustion chambers (not shown) of power source 16 and the power output of power source 16. Controller 24 may embody a single microprocessor or multiple microprocessors for controlling the operation of power train 14 in response to received signals. Numerous commercially available microprocessors can be configured to perform the functions of controller 24. It should be appreciated that controller 24 could readily embody a general machine microprocessor capable of controlling numerous machine functions. Controller 24 may include a memory, a secondary storage device, a processor, and any other components for running an application. Various other circuits may be associated with controller 24 such as power supply circuitry, signal conditioning circuitry, solenoid driver circuitry, and other types of circuitry.

Controller 24 may receive input signals from one or more sensors 32,34, perform one or more algorithms to determine appropriate output signals, and may deliver the output signals to power source 16, generator 18, power storage device 22, and/or fuel delivery system 26. It is contemplated that controller 24 may receive and deliver signals via one or more communication lines (not referenced) as is known in the art.

Sensors 32, 34 may include any conventional sensor configured to establish a signal indicative of a physical parameter, such as, for example, temperature, pressure, speed, time, or any other parameter known in the art. Specifically, sensor 32 may include one or more sensors and may establish signals indicative of parameters of power source 16. Sensor 34 may include one or more sensors and may establish signals indicative of parameters of fuel delivery system 26. For example, sensor 32 may establish signals indicative of power source speed, e.g., revolutions per minute of crankshaft 28, power source temperature, coolant temperature, inlet air temperature, or exhaust temperature, air flow rates, an amount of inlet air delivered to power source 16 in a given time period, valve timing, the movement of intake and/or exhaust valves in a given time, and/or any other parameter associated with power source 16 known in the art. Additionally, sensor 34 may, for example, establish signals indicative of fuel temperature, a temperature of the fuel delivered toward power source 16, fuel flow rate, an amount of fuel delivered toward power source 16 in a given time period, and/or any other parameter associated with fuel delivery system 26 known in the art. It is contemplated that signals established by sensors 32, 34 may embody any signal, such as, for example, a pulse, a voltage level, a digital input, a magnetic field, a sound or light wave, and/or other signal format known in the art.

Controller 24 may determine when and how much power may be supplied by power storage device 22 in response to signals received from sensors 28, 32, 34, and various operator interface devices (not shown). For example, controller 24 may monitor a factor indicative of the air-fuel ratio such as, for example, a fuel rate of fuel entering power source 16. When the fuel rate is close to or approximately the same as a threshold such as, for example, a fuel limit, controller 24 may prevent the power output of power source 16 from increasing and may cause power storage device 22 to supply supplemental power.

The fuel limit may be the maximum rate at which, all of the fuel entering power source 16 may be combusted. Fuel entering power source 16 at a rate greater than the fuel limit may not combust all of the fuel entering power source 16, which may lead to increased emissions generated by power source 16. In addition, as the rate of fuel entering power source 16 may approach the fuel limit, the ratio between inlet fuel (i.e. the amount of fuel entering power source 16) and outlet power (i.e. the magnitude of power generated by power source 16) may increase, and the efficiency of power source 16 may decrease. While operating power source 16 below the fuel limit, it may be more efficient to utilize only power source 16 by itself than to use power from power storage device 22 to assist power source 16. This may be because the ratio of fuel input to power output for power storage device 22 may be greater than the ratio of fuel input to power output of power source 16. The ratio may be greater for power storage device 22 due to various inefficiencies that may cause some power to be lost when being stored in power storage device 22. However, when power source 16 may operate at approximately the fuel limit, the ratio of fuel input to power output for power source 16 may be substantially the same as or greater than the ratio of fuel input to power output for power storage device 22. Therefore, it may be more efficient to use power from power storage device 22 to assist power source 16. Furthermore, when conditions favor assisting power source 16, the amount of power supplied by power storage device 22 may be the difference between the power output of power source 16 and the amount of power requested by an operator via the operator interface devices.

Figure 3:
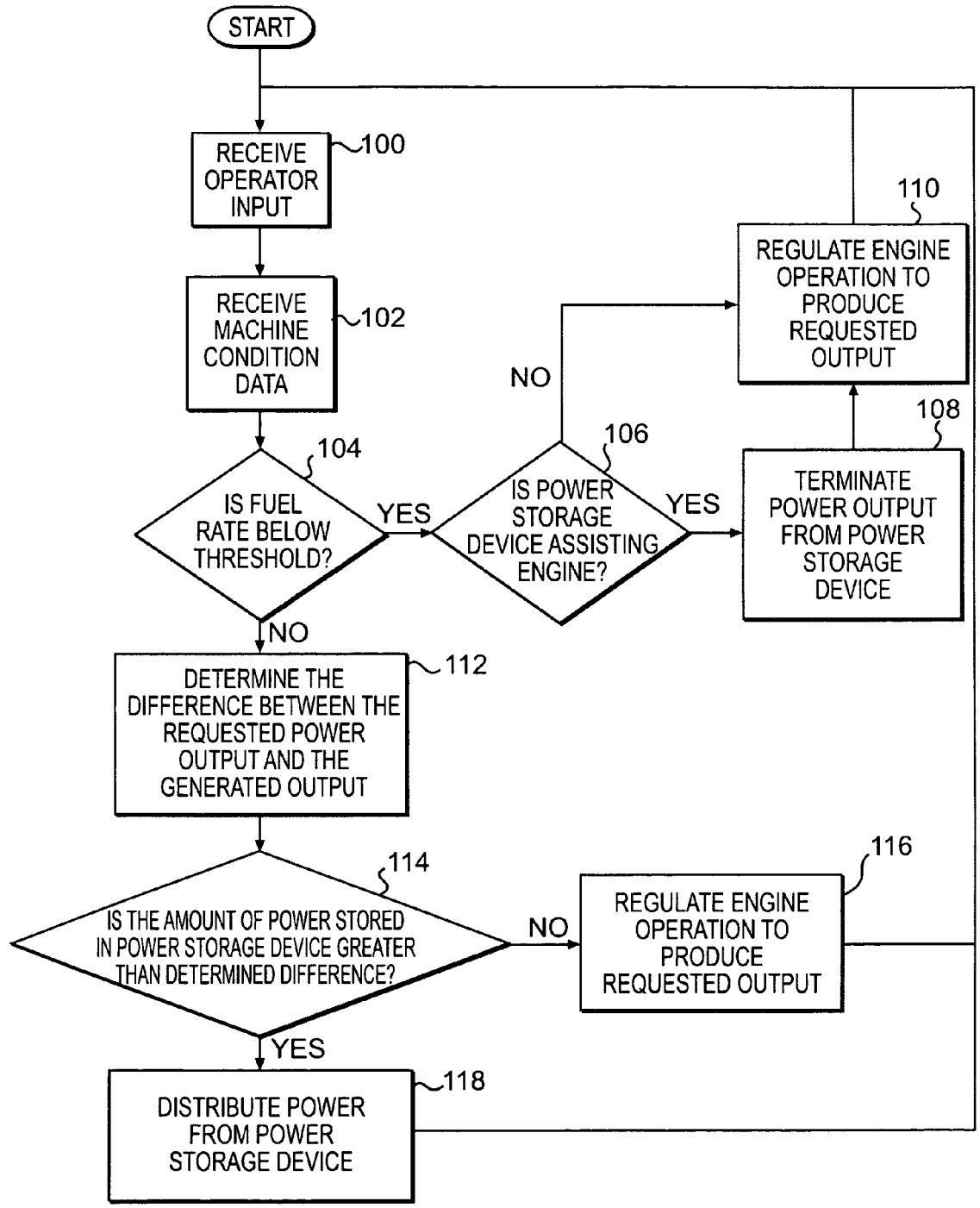
FIG. 3 is a flow chart depicting an exemplary method of operating the power train of FIG. 2.

FIG. 3 illustrates an exemplary method for controlling power train 14. In particular, FIG. 3 is a flow chart representing an exemplary method for causing power storage device 22 to assist power source 16 when the air-fuel ratio falls below a threshold. FIG. 3 will be discussed further in the following section to better illustrate the disclosed system and its operation.

INDUSTRIAL APPLICABILITY

The disclosed power system may effectively reduce emissions during transient loads. In particular, power storage device 22 may assist power source 16 when an air-fuel ratio of power source 16 may fall below a threshold. This may reduce the load on power source 16, thereby maintaining the temperature of exhaust below a critical temperature, which may reduce the amount of emissions. The operation of power train 14 will be described below.

As illustrated in FIG. 3, the method may begin when controller 24 receives input from an operator indicative of a desired output (step 100). For example, the operator may desire an increased power output from power train 14 by actuating an operator interface device (not shown) such as, for example, a pedal, a joystick, a lever, a button, a knob, or any other device capable of generating a signal indicative of an operator's requested output. After receiving the operator input, controller 24 may receive current machine condition data from sensors 30, 32, and 34 (step 102). Such data may include, for example, a current fuel rate, a current power source speed, and a current level of available power in power storage device 22.

After receiving the machine condition data, controller 24 may determine if the fuel rate is below a threshold fuel rate (step 104). The threshold fuel rate may be a value above which, it may be more efficient to assist power source 16 with supplemental power distributed from power storage device 22 than to operate power source 16 without supplemental power from power storage device 22. In other words, the threshold fuel rate may be a value above which, less fuel may be required to produce a total power output from power source 16 and power storage device 22 than the amount of fuel required to produce the same power output from power source 16 by itself. The ratio between the amount of fuel needed by power source 16 and the magnitude of a power output may vary as the fuel rate of fuel entering power source 16 changes. Due to various inefficiencies, more fuel may be required to produce a particular power output of power storage device 22 than the amount of fuel needed only a fraction of the power transmitted to the power storage device is actually stored. When an engine operates below its saturation point, more energy might be needed to produce the power assisting the engine than would be needed by the engine to produce the same output without assistance.

In one exemplary embodiment, the threshold may be the fuel limit of power source 16. Alternatively, the threshold may be a fuel rate below the fuel limit. This may maintain a "buffer" between the maximum allowable fuel rate and the fuel limit, thereby reducing the likelihood of any system malfunctions allowing the fuel rate to exceed the fuel limit. It should be understood that the fuel rate may be indicative of the air-fuel ratio. Adjusting the fuel rate may in turn adjust the air-fuel ratio. Although the exemplary disclosed method may use the fuel rate to manipulate the air-fuel ratio, other parameters of power train 14 may also be used to manipulate the air-fuel ratio. Such parameters may include, for example, power source torque, boost pressure of air exiting a compressor of an air induction system, or any other parameter that may have an effect on the air-fuel ratio.

If controller 24 determines that the fuel rate is below the threshold fuel rate (step 104: Yes), controller 24 may determine if power storage device 22 is providing power to assist power source 16 (step 106). This determination may be made by any method known in the art such as, for example, ascertaining the position of switches (not shown) associated with power storage device 22 that may regulate the distribution of power from power storage device 22. If controller 24 determines that power storage device 22 is providing power to assist power source 16 (step 106: Yes), controller 24 may cause power storage device 22 to terminate the distribution of power (step 108). This may be accomplished by any method known in the art such as, for example, actuating various switches associated with power storage device 22 for regulating the distribution of power. After terminating the distribution of power or if controller 24 determines that power storage device 22 is not providing power to assist power source 16 (step 106: No), controller 24 may regulate the operation of power source 16 to generate an output substantially the same as the output requested by the operator (step 110). After step 110 has been performed, step 100 may be repeated (i.e., controller 24 may receive input from an operator indicative of a desired output).

Referring back to step 104, if controller 24 determines that the fuel rate is not below the threshold fuel rate (step 104: No), controller 24 may determine the difference between the amount of power requested by the operator and the amount of power that power source 16 may be generating (step 112). The amount of power being generated by power source 16 may be ascertained from the signals received from sensor 32 or any other sensor that may transmit signals describing a parameter indicative of the amount of power being generated by power source 16. After determining the difference between the requested power and the generated power, controller 24 may determine if the amount of power stored in power storage device 22 is greater than the difference between the requested power and the generated power (step 114).

If controller 24 determines that the amount of power stored in power storage device 22 is not greater than the difference between the requested power and the generated power (step 114: No), controller 24 may regulate the operation of power source 16 to generate an output substantially the same as the output requested by the operator (step 116). After step 116 has been performed, step 100 may be repeated (i.e., controller 24 may receive input from an operator indicative of a desired output).

If controller 24 determines that the amount of power stored in power storage device 22 is greater than the difference between the requested power and the generated power (step 114: Yes), controller 24 may cause power storage device 22 to distribute power to the power train so that the combined power output from power source 16 and power storage device 22 may be substantially the same as the power output requested by the operator (step 118). The regulation of power being released from power storage device 22 may be performed by utilizing any device or method known in the art such as, for example, utilizing an inverter (not shown). In addition, the operation of power source 16 may be restricted so that its power output may not increase beyond the level generated when the fuel rate is substantially the same as the fuel rate threshold.

Alternatively, it is contemplated that for embodiments utilizing a fuel rate threshold below the fuel limit, the power source output may be allowed to increase when the fuel rate is above the fuel rate threshold. The combination of the power output of power source 16 and the power output of power storage device 22 may be regulated according to a map or algorithm stored in the memory of controller 24. This map or algorithm may be designed to increase the efficiency of power train 14 when generating the desired power output. However, when the fuel rate increases to a level substantially the same as the fuel limit, controller 24 may prevent the power output of power source 16 from increasing any further. After step 118 has been performed, step 100 may be repeated (i.e., controller 24 may receive input from an operator indicative of a desired output).

Because the disclosed power train system may consider parameters indicative of the air-fuel ratio such as fuel rate, the power train may be able to achieve an increased efficiency during transient load events. In particular, energy from the power storage device may be used only when it is determined that assisting the power source may be more efficient than operating the power source without assistance. For example, less fuel may be consumed to produce a power output when the power source may be operating without assistance and the fuel rate may be below the fuel limit. In addition, less fuel may be consumed to produce a power output when the power source may be operating with assistance from the power storage device when the fuel rate is substantially the same as or above the fuel limit. Therefore, by considering the fuel rate, and ultimately the air-fuel ratio, the power train may achieve an increased efficiency during transient loads.

It will be apparent to those skilled in the art that various modifications and variations can be made in the disclosed system without departing from the scope of the disclosure. Other embodiments will be apparent to those skilled in the art from consideration of the specification disclosed herein. It is intended that the specification and examples be considered as exemplary only, with a true scope being indicated by the following claims and their equivalents.

What is claimed is:

1. A power train, comprising:
    a power source for generating a power output;
    a power storage device for storing and distributing power; and
    a controller configured to cause the distribution of power from the power storage device for assisting the power source when the rate of fuel entering the power source is above a threshold fuel rate, the threshold fuel rate being a fuel rate at which, assisting the power source increases the efficiency of the power train;
    wherein the controller is further configured to:
    1) determine an amount of power currently stored in the power storage device and an amount of power currently being generated by the power source; and
    2) cause the power storage device to distribute power when the fuel rate is above the threshold fuel rate and the amount of power stored in the power storage device is greater than the difference between the amount of power currently being generated by the power source and a desired power output.

2. The power train of claim 1, wherein the controller is configured to prevent the distribution of power from power storage device when the power available from the power storage device is less than the difference between the amount of power currently being generated by the power source and the desired power output.

3. The power train of claim 2, wherein the threshold fuel rate is a fuel limit of the power source, the fuel limit being a fuel rate above which, less than all of the fuel entering the power source is combusted.

4. The power train of claim 3, wherein the controller is configured to prevent the rate of fuel entering the power source from increasing when the rate of fuel entering the power source is above the threshold fuel rate.

5. The power train of claim 2, wherein the threshold fuel rate is a rate below a fuel limit of the power source, the fuel limit being a fuel rate above which, less than all of the fuel entering the power source is combusted.

6. The power train of claim 5, wherein the controller is configured to prevent the fuel rate rate of fuel entering the power source from increasing when the rate of fuel entering the power source is above the fuel limit.

7. A method for operating a power train, comprising:
    sensing a first parameter indicative of a rate of fuel entering a power source;
    sensing a second parameter indicative of an amount of power generated by the power source; and
    distributing power from a power storage device to assist the power source when an amount of power stored in the power storage device is greater than the difference between the amount of power currently being generated by the power source and the desired power output, and the rate of fuel entering the power source is above a threshold fuel rate, the threshold fuel rate being a fuel rate at which, assisting the power source increases the efficiency of the power train.

8. The method of claim 7, wherein the threshold fuel rate is a fuel limit of the power source, the fuel limit being a fuel rate above which, less than all of the fuel entering the power source is combusted.

9. The method of claim 8, further including preventing the rate of fuel entering the power source from increasing when the rate of fuel entering the power source is above the threshold fuel rate.

10. The method of claim 7, wherein the threshold fuel rate is a rate below a fuel limit of the power source, the fuel limit being a fuel rate above which, less than all of the fuel entering the power source is combusted.

11. The method of claim 10, further including preventing the rate of fuel entering the power source from increasing when the rate of fuel entering the power source is substantially the same as or above the fuel limit.

12. A method for operating a power train, comprising:
receiving an input from an operator requesting a desired power output;
sensing a first parameter indicative of a rate of fuel entering a power source;
sensing a second parameter indicative of an amount of power generated by the power source;
sensing a third parameter indicative of an amount of power stored in a power storage device; and
distributing power from the power storage device when the amount of power stored in the power storage device is greater than the difference between the amount of power currently being generated by the power source and the desired power output, and the fuel rate is above a threshold fuel rate, the threshold fuel rate being a fuel rate at which, assisting the power source increases the efficiency of the power train.

13. The method of claim 12, further including preventing the distribution of power from power storage device when the power available from the power storage device is less than the difference between the amount of power currently being generated by the power source and the desired power output.

14. The method of claim 13, further including regulating the distribution of power from the power storage device so that the combined power from the power source and the power storage device is substantially the same as the desired power output.

15. The method of claim 14, wherein the threshold fuel rate is a fuel limit of the power source, the fuel limit being a fuel rate above which, less than all of the fuel entering the power source is combusted.

16. The method of claim 15, further including preventing the rate of fuel entering the power source from increasing when the rate of fuel entering the power source is above the threshold fuel rate.

17. The method of claim 14, wherein the threshold fuel rate is a rate below a fuel limit of the power source, the fuel limit being a fuel rate above which, less than all of the fuel entering the power source is combusted.

18. The method of claim 17, further including preventing the rate of fuel entering the power source from increasing when the rate of fuel entering the power source is above the fuel limit.

\* \* \* \* \*

UNITED STATES PATENT AND TRADEMARK OFFICE
CERTIFICATE OF CORRECTION

| | | |
|---|---|---|
| PATENT NO. | : 8,348,804 B2 | Page 1 of 1 |
| APPLICATION NO. | : 12/010075 | |
| DATED | : January 8, 2013 | |
| INVENTOR(S) | : Lane et al. | |

It is certified that error appears in the above-identified patent and that said Letters Patent is hereby corrected as shown below:

In the Specification

Column 4, line 30, delete "sensors 32,34," and inset -- sensors 32, 34, --.

In the Claims

Column 8, line 43, in Claim 6, delete "the fuel rate rate" and insert -- the rate --.

Signed and Sealed this
Eighteenth Day of August, 2015

Michelle K. Lee
*Director of the United States Patent and Trademark Office*